United States Patent Office 2,783,127
Patented Feb. 26, 1957

2,783,127

ANTACID AND METHOD OF MAKING THE SAME

Irvine W. Grote, Chattanooga, Tenn., assignor to The Chattanooga Medicine Company, Chattanooga, Tenn., a corporation of Tennessee No Drawing. Application December 28, 1953, Serial No. 400,822

4 Claims. (Cl. 23—61)

This invention relates to new chemical compounds and a method of preparing the same, and more particularly to new dihydroxy aluminum complexes which have been found useful as antacid compounds, and to the method of preparing the same.

Although the use of the instant compounds is not necessarily limited to their use in antacid compositions, it has been found that these compounds possess unusually superior properties as antacid compounds suitable for medicinal use for the relief of excess gastric acidity. Several methods of relieving excess gastric acidity and stomach distress are now in common use. For example, one method involves the use of sodium bicarbonate, which is known to act very promptly. This method leaves much to be desired in that an excess amount of sodium bicarbonate will make the stomach actually alkaline, hence, making additional distress. Calcium carbonate and alumina (or aluminum hydroxide) gels have been sold under various trade names for the purposes here involved, but such materials are open to objection because their action is usually considered too slow. Another undesirable feature of most antacid compositions that are now available is that these compositions have very little "lasting" power in many cases, in that they tend to become rapidly less effective in controlling gastric acidity over a period of time.

The instant compounds are new compounds which combine many of the most important desirable features of antacid compounds and which avoid many of the more undesirable features. Another aspect of the instant invention also resides in the discovery of a suitable method for the preparation of these compounds.

It is, therefore, an important object of the instant invention to provide an improved antacid compound, a novel chemical compound, and an improved new method for the preparation thereof.

It is a further object of the instant invention to provide an improved dihydroxy aluminum alkali metal carbonate or ammonium carbonate; and to provide an improved method for the preparation thereof by reacting an aluminum compound with the corresponding bicarbonate compound, in the presence of water.

Other features, advantages and novel aspects of the instant invention will become apparent to those skilled in the art from the following detailed description of preferred embodiments thereof.

The instant invention consists in the compound

wherein X is a monovalent radical of the class consisting of alkali metal and ammonium radicals.

The instant invention also consists in the method of preparing

wherein X is a monovalent radical of the class consisting of alkali metal and ammonium radicals, that comprises bringing together a hydrolyzable aluminum compound and XHCO₃, in the presence of water, and then recovering the (HO)₂AlOCO₂X reaction product.

The compounds of the instant invention are true dihydroxy aluminum compounds, as contrasted to various alumina or hydrated alumina compounds, and as contrasted to mere admixtures of aluminum hydroxide and alkali metal carbonates or bicarbonates, for example. The differences in chemical behavior in several respects between the instant compounds and the other mentioned compounds may be clearly demonstrated. In particular, it should be pointed out that the instant compounds differ critically from certain compounds which have been described as sodium aluminum carbonate, these compounds being prepared by flowing a solution of alkali metal aluminate into a solution of alkali metal bicarbonate, with the simultaneous introduction of carbon dioxide (as in German Patent No. 19,784 of 1882).

One of the reactants used in the instant method is a hydrolyzable aluminum compound. The preferred type is aluminum iso-propylate (tri-isopropoxide), but other aluminum trialkoxides may be used, including aluminum ethylate, tertiary butylate, etc. most preferably, the alkoxide groups are C₂—C₄ groups; and the aluminum alcoholate, it is well known, reacts with water ordinarily to form aluminum hydroxide (or at least it is hydrolyzed in aqueous media to split off the alkoxide groups).

The reaction here involved may be represented as follows:

(1) 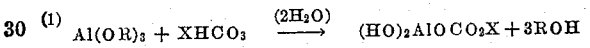

wherein R is a C₂—C₄ alkyl group and X has the meaning hereinbefore indicated. Since it is known that the aluminum alcoholate hydrolyzes in aqueous media, and has produced dihydroxy aluminum compounds with many known acids, it would be expected that, if any reaction takes place under the instant conditions, it should be the formation of dihydroxy aluminum bicarbonate because it is known that the bicarbonate XHCO₃, ionizes as follows:

(2) 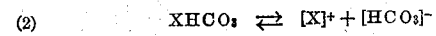

Furthermore, since such solutions as aqueous sodium bicarbonate are basic, it would be expected that the increased supply of hydroxyl ions would further increase the probability of the formation of aluminum hydroxide instead of some complex thereof; and it could logically be expected that no reactions would take place. Such, however, is not the case and the product obtained has been definitely established as a true compound, containing the various elements thereof in the proportions indicated.

Other hydrolyzable aluminum compounds may also be used, and these compounds include the soluble dried aluminium hydroxide gels as well as compounds which are hydrolyzable to form aluminum hydroxide in aqueous media. The water solubility of the aluminum compound need not be "molecular" in character, since it may involve a sol-gel system such as that involved using the dried aluminum hydroxide gels, but the aluminum compound in the aqueous medium must be dissolved or intimately dispersed so as to constitute a substantially homogeneous solution as contrasted to a two phase suspension or actual precipitate formation. The precipitate formed in the instant reaction is the reaction product desired.

The aluminum acylates may be used and these include aluminum acetate, basic aluminum acetate, aluminum acetotartrate, aluminum benzoate, aluminum boroformate, aluminum borotartrate, aluminum glycinate, aluminum lactate, aluminum glycolate, aluminum alaninate, aluminum p- phenolsulfonate, aluminum beta-naphtholsulfonate, etc. The invention does not preclude the use of the so-called insoluble or difficulty soluble aluminum compounds which can be caused to go into aqueous solution by the presence of alcohol solvents or basic reactants (acid reactants being unsuitable because of the presence of the bicarbonate anion); such compounds include aluminum oxalate; aluminum salicylate and the aluminum salts of the higher (i. e. $C_8$—$C_{18}$) fatty acids such as oleate, stearate, palmitate, myristate, etc. Preferably, however, a basic aluminum alkanoate is used; and most preferably a $C_2$—$C_6$ alkanoate. A typical reaction is as follows:

(3)

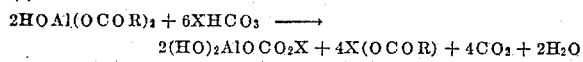

The invention also contemplates the use of water soluble aluminum compounds which are (ionizable) salts of inorganic acids. In such cases the anion of these salts should be one which forms a weaker bond with aluminum than does the —OH group in an alkaline aqueous system, or expressed in other terms, it has a greater tendency to neutralize the X cation than it does to remain bonded to aluminum. A typical reaction of this type using a divalent anion "A" is as follows:

(4)

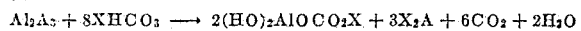

It will thus be seen that, in the case of organic (—OCOR) and inorganic (=A) anions which form acids, the amount of $XHCO_3$ employed is at least one molar equivalent for each Al present in the equation and also a sufficient number of additional molar equivalents to effectively neutralize all of the anions present so as to form the X salt of the anion. Thus in a compound containing $n$ Al atoms (which, obviously, form the cationic component) in the molecule and $m$ anions each having a valence of $y$ the number of $XHCO_3$ mols used per mol of the compound is at least $n$ plus $y$ $m$. An excess of $XHCO_3$ does not appear to affect the reaction as the excess $XHCO_3$ is removed from the product by water washing.

The inorganic aluminum salts which may be used include aluminum borate, bromate, bromide, chloride, iodide, phosphate, sulfate, nitrate, etc. Of course, any compounds having toxic properties should be avoided unless extremely careful washing of the product is contemplated; but these compounds may be operative to effectively prepare a dihydroxy aluminum carbonate compound of the invention.

The second reactant, as has been indicated, is $XHCO_3$; and the reaction is carried out in the presence of water. The bicarbonate, of course, enters into solution so that it is adequately reactive to combine with the aluminum compound in the solution. The bicarbonates which may be used include ammonium carbonate and the alkali metal bicarbonates (which are for practical purposes the sodium and potassium bicarbonates, since such others as the lithium, cesium, etc. bicarbonates have no industrial significance, even though operative herein).

The aluminum compound and bicarbonate may be admixed dry and added to the water; or they may be added separately; or they may be dissolved separately and the solutions admixed. In reactions which involve a rapidly hydrolyzable aluminum compound the bicarbonate is preferably dissolved in aqueous solution first and the aluminum compound added thereto. In reactions which are not extremely fast or which require additional heat and/or agitation to proceed at a reasonable rate, there may not be too much advantage in having one or both reactants in solution before being brought into contact, since one of the main advantages of this latter feature is that it tends to avoid precipitation of a reactant with the product (by occlusion). In a preferred procedure, bicarbonate is dissolved in aqueous solution and the aluminum alcoholate (in substantially anhydrous unhydrolyzed form) is added thereto in the preferred procedure, with the result that a gelatinous precipitate forms very rapidly. Continued stirring results in a more granular easily filtered precipitate, which may be readily separated from the aqueous remainder of the reaction system.

The following examples show specific embodiments:

*Example I*

Sodium bicarbonate (42 g.; 0.5 M) was dissolved in 350 cc. of warm water and stirred vigorously while aluminum isopropylate (102 g.; 0.5 M) was added in a thin stream. Precipitation of a gelatinous product was rapid. On continued stirring the precipitate became granular and filtered easily. The filtered precipitate was air dried for several days and then dried in an oven for three hours (at 65° C.) to a moisture content of about 15%.

A study of the "prolonged neutralization curve" by the method of Holbert, Noble and Grote in "Journal of American Pharmaceutical Association," 36, 149 (1947) showed a rapid rise to pH 4.5 which receded to pH 4.0 in about 30 minutes and eventually drifted to pH 3.15 at the end of 3 hours. The acid consuming power of this product (on a dry basis) is 267 cc. of 0.1 NHCl per 1 g. of material (which is very close to the theoretical 278 cc. for this compound). Both of these results show superior antacid properties in the material.

The equation for the reaction may be represented as follows:

(5)

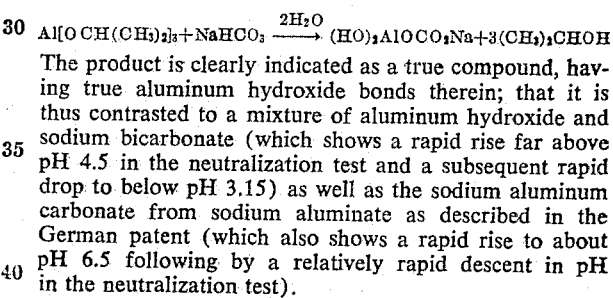

The product is clearly indicated as a true compound, having true aluminum hydroxide bonds therein; that it is thus contrasted to a mixture of aluminum hydroxide and sodium bicarbonate (which shows a rapid rise far above pH 4.5 in the neutralization test and a subsequent rapid drop to below pH 3.15) as well as the sodium aluminum carbonate from sodium aluminate as described in the German patent (which also shows a rapid rise to about pH 6.5 following by a relatively rapid descent in pH in the neutralization test).

As another showing of the true compound character of the instant product, products were also made using two and three times the molar equivalent of sodium bicarbonate (per mole of aluminum isopropylate); and it appeared that the product was merely dihydroxy aluminum sodium carbonate plus occluded sodium bicarbonate. This was established by water leading of the products and then testing for $CO_2$ content and the pH in aqueous suspension. It was found that the $CO_2$ contents and the pH readings were substantially identical to that of the initially prepared dihydroxy aluminum sodium carbonate.

*Example II*

A procedure that is the same as that described for Example I is carried out except that $KHCO_3$ (50 g.; 0.5 M) is used instead of the $NaHCO_3$ with the result that dihydroxy aluminum potassium carbonate is obtained. This compound has superior antacid properties comparable to those of its sodium analogue.

*Example III*

Ammonium bicarbonate (0.4 M) was dissolved in 100 cc. of water at room temperature and stirred vigorously while aluminum isopropylate (0.4 M) was added thereto. After standing over night, the dihydroxy aluminum ammonium carbonate precipitated was removed by filtration and air dried to obtain a yield of 46.1 g. This compound also showed superior antacid properties, although it does show a slightly higher initial rise in pH than the alkali metal analogues in the neutralization test.

As will be seen, the instant reaction involving a hydrolyzable compound such as the alcoholate takes place merely upon bringing together the aluminum alcoholate and the bicarbonate in solution. No particular temperatures or pressures are required for accomplishing the instant reaction. The temperature employed may range from room temperature or below up to temperatures just below the boiling point of the aqueous system. Preferably, the temperature used is not so high as to cause interference with the reaction (for example, by decomposition of the bicarbonate); nor is it desirable to unduly accelerate the instant reaction because this tends to cause the entrapment of the unreacted bicarbonate in the precipitate.

Where the cationic aluminum compound used as the starting material is an aluminum alcoholate or an aluminum hydroxide gel, the reactants, the aluminum and bicarbonate compounds, respectively, react with each other in a 1 to 1 molar ratio and a substantial excess of either reactant is usually neither necessary nor desirable, although it is preferable to employ an excess of the bicarbonate but only to the extent necessary to insure a complete reaction of the more expensive reactant, the aluminum compound. Where, however, the cationic aluminum compound used as the starting material is an aluminum acylate or an aluminum salt of an inorganic acid, there should be used a quantity of the bicarbonate not only equivalent to at least one mole of bicarbonate for each mole of aluminum present but a sufficient additional quantity of bicarbonate to effect the neutralization of the anions associated with the aluminum in the starting compound. Thus, in Examples IV and V, set forth below, in addition to a quantity of bicarbonate sufficient to react in equi-molar proportions to the aluminum present, there is a further quantity of bicarbonate added to neutralize the acetate or suphate anion, as the case may be.

In the ordinary reaction embodying the instant invention, the sole precipitate is the dihydroxy aluminum compound of the invention, and the separation of this compound from the aqueous remainder of the reaction may be accomplished by any ordinary means, such as ordinary filtration.

It will be noted, however, that in the case of less readily hydrolyzed compounds or the various aluminum hydroxide gels and/or aluminum salts of organic or inorganic acids the use of heat is preferred to expedite the reaction. Preferably, a temperature of 40–80° C. is used, and most preferably 60–70° C.

*Example IV*

Basic aluminum acetate (.1 mole, 37.8 gms.) was mixed with sodium bicarbonate (.6 mole, or 50.4 gms.). To this was added 100 cc. of water at 60° C. and the mixture was heated on a water bath for 4 hours at 60–70° C. The mixture was allowed to stand over night and filtered. The dihydroxy alumium sodium carbonate was air dried to a moisture content of 10–15%. It was then leached with 5 times its weight of water. After standing at least ¼ hour it was filtered and washed on the filter with water equal to the original weight of material. The dihydroxy aluminum sodium carbonate was then dried to a moisture content of 10–15%.

The equation for the reaction is:

(6) 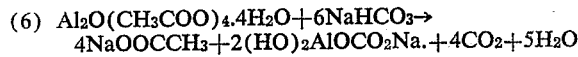
$$Al_2O(CH_3COO)_4 \cdot 4H_2O + 6NaHCO_3 \rightarrow$$
$$4NaOOCCH_3 + 2(HO)_2AlOCO_2Na + 4CO_2 + 5H_2O$$

*Example V*

Aluminum sulfate, hydrated (0.1 mole, 66.6 gms.) was thoroughly mixed with sodium bicarbonate (0.8 mole, 67.2 gms.) and 125 cc. of 60° C. water added. After mixing the material was heated on the water bath 2 hours at 65° C. It was air dried over the week end and washed with considerable water until the filtrate gave no test for sulfates. The dihydroxy aluminum sodium carbonate was then dried to 10–15% moisture.

The equation for the reaction is (7) 
$$Al_2(SO_4)_3 \cdot 18H_2O + 8NaHCO_3 \rightarrow$$
$$2(HO)_2AlOCO_2Na + 3Na_2SO_4 + 6CO_2 + 20H_2O$$

*Example VI*

Reheis "F–1000" dried aluminum hydroxide gel (0.2 mole–20.4 gms.) was thoroughly mixed with sodium bicarbonate (0.2 mole, 16.8 gms.) and 100 cc. of 65° C. water. The mixture was heated 2 hours in the water bath at 60–70° C. It was air dried over the weekend. The dihydroxy aluminum sodium carbonate was then leached with 5 times its weight of water and filtered. The cake was washed on the filter with water equal to the original weight of dihydroxy aluminum sodium carbonate. It was dried to 10–15% moisture.

The reaction is:

(8) 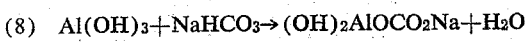
$$Al(OH)_3 + NaHCO_3 \rightarrow (OH)_2AlOCO_2Na + H_2O$$

*Example VII*

Reheis Aluminum hydroxide, compressed gel, "F–500," (0.2 mole, 102 gms.) was mixed with sodium bicarbonate (0.2 mole, 16.8 gms.) and heated at 60–70° C. for 6 hours. The dihydroxy aluminum sodium carbonate was allowed to stand over night and was then filtered. It was air dried. It was then leached with water as in VI and dried to 10–15% moisture.

The reaction is:

(9) 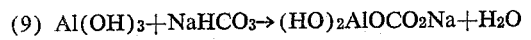
$$Al(OH)_3 + NaHCO_3 \rightarrow (HO)_2AlOCO_2Na + H_2O$$

Each of the compounds thus obtained as reaction products is found to have superior acid consuming power and to have a prolonged neutralization curve, as herein before indicated.

It will also be noted that the instant invention contemplates the formation of substantially pure

$$(HO)_2AlOCO_2X$$

not only for a contemplated medicinal use but also for the purpose of obtaining maximum effectiveness from the material for the use contemplated. For this reason, the use of aluminum alcoholates as starting materials is preferred, the yield being greater and the product in pure form being more readily obtained. In the case of certain other starting materials particularly the inorganic aluminum salts (which are readily ionizable), it has been found that there may in many cases be an initial tendency toward formation and precipitation of aluminum hydroxide gel (in the alkaline aqueous medium caused by the bicarbonate); this may be overcome or reduced by first dissolving the bicarbonate before addition of the aluminum compound (per se or in a separate solution) or it may be overcome substantially by heating above room temperature (at the temperatures hereinbefore indicated) for a period of time sufficient to cause the desired reaction to go to completion as evidenced by an analysis of the precipitate which does not change with further heating. In other words, the final reaction product is that desired; but merely admixing the aluminum compound and the bicarbonate, in the presence of water, may result in such an appreciable precipitation of aluminum hydroxide gel and occluded reactants that the amount of $(HO)_2AlOCO_2X$ present will be substantially concealed or perhaps its formation initially may be substantially prevented. Hence the step of recovering this desired product. Recovery may be accomplished merely by filtration (and some washing) in the preferred reaction with aluminum alcoholate or it may be accomplished by continued heating (which has the effect of washing and of re-dissolving precipitated forms of aluminum hydroxide gel) until further heating has little or no appreciable effect upon the precipitate analysis (i. e. the apparent empirical formula).

Modifications and alterations may be employed without departing from the scope of the instant invention.

I claim as my invention:

1. A method of preparing a gastric antacid compound selected from the class consisting of dihydroxy aluminum alkali metal carbonates and dihydroxy aluminum ammonium carbonate, which comprises bringing together, in the presence of water, a cationic aluminum compound of the class consisting of aluminum acylates and aluminum salts of inorganic acids and a quantity of $XHCO_3$, wherein X is a monovalent radical of the class consisting of alkali metal and ammonium radicals, equivalent to at least one mole of $XHCO_3$ for each mole of aluminum present plus a sufficient quantity of $XHCO_3$ to effect the neutralization of the anions associated with said aluminum present and the precipitation of the selected antacid compound and recovering the same.

2. The method of claim 1, wherein the cationic aluminum compound is basic aluminum acetate.

3. The method of claim 1, wherein the cationic aluminum compound is an aluminum salt of an inorganic acid.

4. The method of claim 1, wherein the cationic aluminum compound is aluminum sulphate.

References Cited in the file of this patent

UNITED STATES PATENTS

| | | |
|---|---|---|
| 1,944,327 | Hunyady | Jan. 23, 1934 |
| 2,137,638 | Sondern et al. | Nov. 22, 1938 |
| 2,382,732 | Lowenstein | Aug. 14, 1945 |

OTHER REFERENCES

Mellor: "Comprehensive Treatise on Inorganic and Theoretical Chemistry," vol. 5, 1924 page 359. Longmans, Green and Co., N. Y. C. (Copy in Scientific Library.)